United States Patent
Schilling

[11] Patent Number: 6,099,257
[45] Date of Patent: Aug. 8, 2000

[54] PLASTICALLY FORMED HYBRID AIRFOIL

[75] Inventor: Jan C. Schilling, Middletown, Ohio

[73] Assignee: General Electric Company, Cincinnati, Ohio

[21] Appl. No.: 09/386,424

[22] Filed: Aug. 31, 1999

[51] Int. Cl.⁷ ............................................. B63H 1/26
[52] U.S. Cl. ........................... 416/229 A; 416/241 R; 416/223 A
[58] Field of Search ............... 416/229 A, 229 R, 416/236 R, 228, 241 R, 500, 220, 224, 233, 241 A

[56] References Cited

U.S. PATENT DOCUMENTS

| | | | |
|---|---|---|---|
| 3,327,995 | 6/1967 | Blackhurst et al. | 253/77 |
| 3,796,513 | 3/1974 | Jonas | 416/224 |
| 4,118,417 | 10/1978 | Ellis | 416/230 |
| 5,295,789 | 3/1994 | Daguet | 416/241 |
| 5,634,771 | 6/1997 | Howard et al. | 416/241 A |
| 5,655,883 | 8/1997 | Schilling | 416/229 A |
| 5,791,879 | 8/1998 | Fitsgerald et al. | 416/229 A |
| 5,839,882 | 11/1998 | Finn et al. | 416/229 A |
| 6,033,186 | 3/2000 | Schilling et al. | 416/233 |

*Primary Examiner*—Edward K. Look
*Assistant Examiner*—James M. McAleenan
*Attorney, Agent, or Firm*—Andrew C. Hess; Gerry S. Gressel

[57] ABSTRACT

A plain blank is sized to produce an airfoil. The blank is plastically formed to include a pocket blending smoothly in one side thereof. Leading and trailing edges of the airfoil are benched. And, filler is placed into the pocket to effect an aerodynamic profile for the airfoil.

4 Claims, 4 Drawing Sheets

PLASTICALLY FORMED HYBRID AIRFOIL

BACKGROUND OF THE INVENTION

The present invention relates generally to gas turbine engines, and, more specifically, to airfoil manufacture therefor.

A primary objective in designing turbofan gas turbine engines for propelling aircraft in flight is weight reduction. The engine should have minimum weight consistent with adequate strength for durability and long life.

In large turbofan engines, the fan blades are correspondingly large and generate significant centrifugal force during operation. Disposed downstream from the blades are stationary guide vanes which are also relatively large. The blades and vanes have corresponding airfoils specifically configured to aerodynamically cooperate with ambient air channeled thereover for producing propulsion thrust during operation. Such airfoils are typically solid metal, which may be lightened in weight by introducing cavities therein, with an attendant manufacturing cost therefor.

Composite fan blades including laminations of structural fibers in a bonding matrix are also known. These composite fan blades enjoy reduced weight while maintaining high strength, yet are expensive to produce.

In another development, hybrid airfoils using a high strength metal, such as titanium, are formed with integral pockets therein for reducing weight while maintaining strength. And, a filler is bonded into the pockets for completing the required aerodynamic profile of the airfoil.

Such hybrid airfoils may be manufactured by initially forming or forging a nominal airfoil to approximate final shape, and then completing the final shape by machining. The individual pockets are machined into the forged airfoil and must be suitably configured for avoiding stress concentrations.

Since a fan blade operates under substantial centrifugal force, any discontinuities or abrupt changes in contour of the airfoil are local sites of stress concentration. Intervening ribs between adjacent filler pockets must be suitably sized with relatively large blending radii to reduce stress concentration in the blade, as well as reduce peeling stress on the filler as the blade strains during operation. Although weight is removed from the blade by providing the pockets and lightweight filler therein, the required separating ribs limit the amount of weight reduction practical.

Accordingly, it is desired to provide an improved method of forming a hybrid airfoil for reducing or eliminating the need for machined pockets for the filler, while maintaining airfoil strength.

BRIEF SUMMARY OF THE INVENTION

A plain blank is sized to produce an airfoil. The blank is plastically formed to include a pocket blending smoothly in one side thereof. Leading and trailing edges of the airfoil are benched. And, filler is placed into the pocket to effect an aerodynamic profile for the airfoil.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
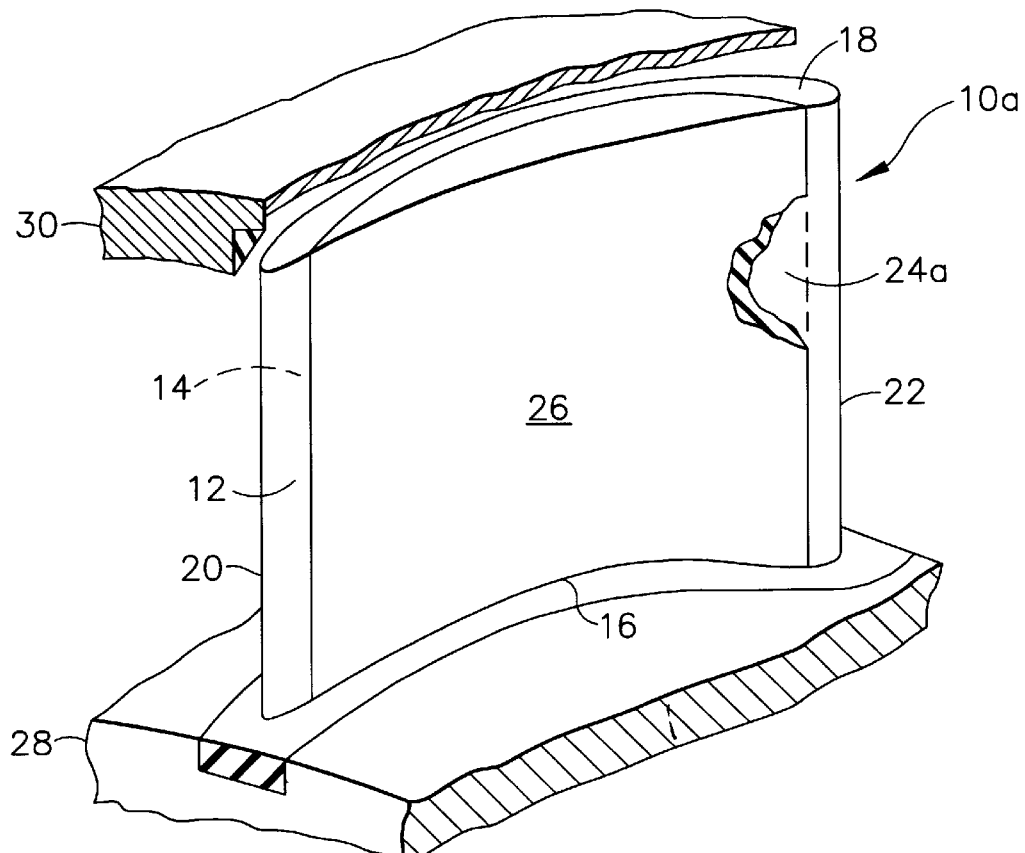
FIG. 1 is an isometric view of an exemplary fan outlet guide vane having a filled pocket on one side thereof formed in accordance with an exemplary embodiment of the present invention.

Illustrated in FIG. 1 is an exemplary airfoil 10a in the form of a fan outlet guide vane for a turbofan gas turbine engine used in powering an aircraft in flight. The airfoil includes a generally concave, first side 12, and a circumferentially opposite, generally convex second side 14. The two sides extend from a radially inner root 16 to a radially outer tip 18 along the span of the airfoil, and extend axially or chordally from a leading edge 20 to a trailing edge 22.

The first side 12 includes a smooth pocket 24a blending smoothly therein without discontinuity or sharp radii. A suitable filler 26 is bonded in the pocket and completes or effects the required aerodynamic profile or contour of the airfoil as desired. In a preferred embodiment, the filler 26 is an elastomeric material, such as polyurethane rubber, which may be injected and self-bonded into the pocket during the manufacturing process. Or, the pocket may be filled by other suitable processes, such as molding or casting for example.

The outlet guide vane 10a illustrated in FIG. 1 is one type of hybrid airfoil which may be manufactured in accordance with the present invention. The vane is one of a full row of such vanes extending radially between inner and outer band 28, 30 and conventionally mounted therein in corresponding recesses filled with a potting material such as silicone.

Figure 2:
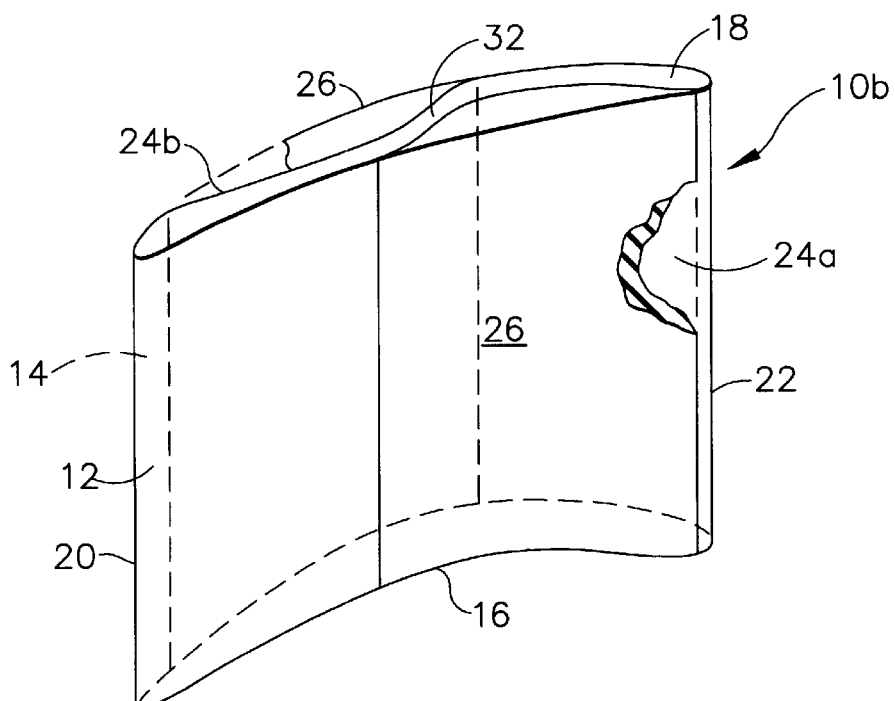
FIG. 2 is another embodiment of the fan outlet guide vane having filled pockets on opposite sides.

Illustrated in FIG. 2 is another embodiment of an outlet guide vane 10b in which a smooth first pocket 24a is formed in the airfoil first side 12 adjoining the trailing edge 22. And, a smooth second pocket 24b is formed in the airfoil second side 14 adjoining the leading edge 20. The two pockets 24a,b overlap each other only in part and they are separated by a common septum 32 which is a smooth portion of the main body of the airfoil itself.

In both embodiments illustrated in FIGS. 1 and 2, the respective pockets thereof extend the full span of the main bodies of the airfoils which are preferably metal, such as titanium or aluminum. The pockets extend only partly between the leading and trailing edges which remain metal for strength, with the filler being spaced chordally therefrom. The filler 26 is bonded in both pockets 24a,b to complete the aerodynamic profile on both sides of the airfoil.

Figure 3:
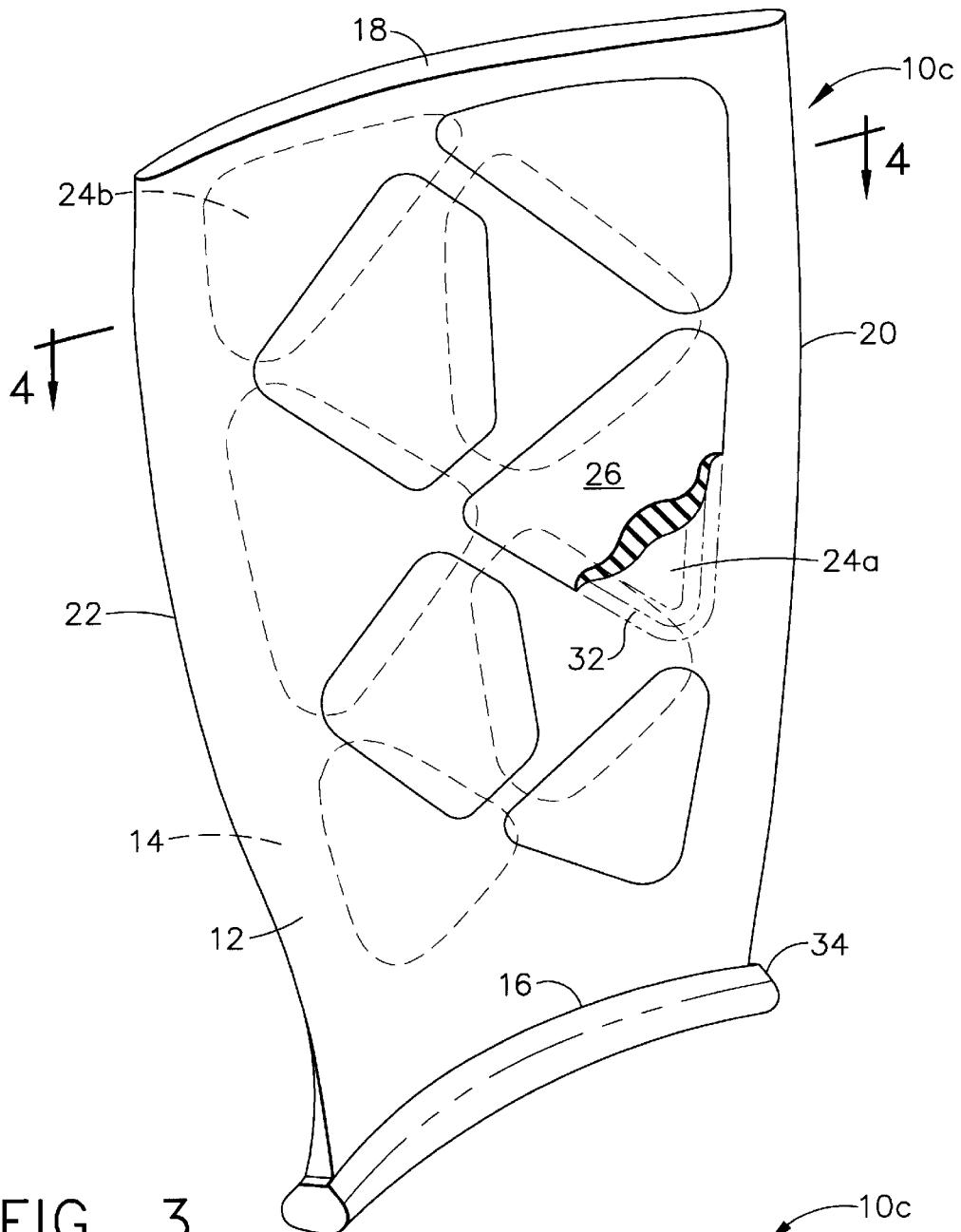
FIG. 3 is a fan blade having multiple filled pockets on opposite sides of the airfoil thereof in accordance with another embodiment of the present invention.
Figure 4:
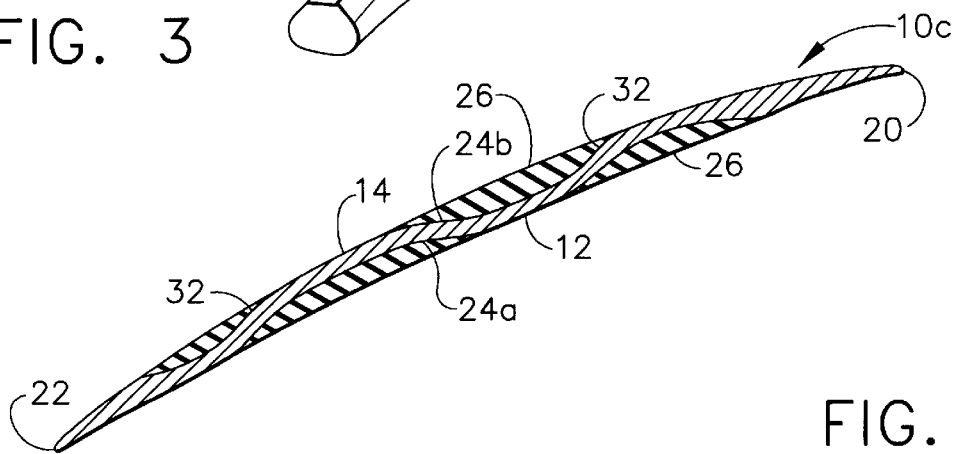
FIG. 4 is a radial sectional view through the airfoil illustrated in FIG. 3 and taken generally along line 4—4.

Illustrated in FIGS. 3 and 4 is another embodiment of the airfoil 10c which forms a fan rotor blade having an integral dovetail 34 adjoining the airfoil root 16. In this exemplary embodiment, a plurality of the first pockets 24a are disposed in the airfoil first side 12. And, a plurality of the second pockets 24b are disposed in the airfoil second side 14 and individually overlap multiple or plural ones of the first pockets 24a in a corrugated or waffle configuration.

The pockets on opposite sides of the airfoil are simply separated by the intervening septums 32 which provide structural rigidity to the airfoil proper. The septums 32 as shown in FIG. 4 smoothly curve between the opposite sides of the airfoil for defining the perimeters of the individual pockets which are shallow, smooth walled bowls, without discontinuity therein or abrupt changes which would prevent their manufacture using various forms of plastic deformation such as forging or rolling. By eliminating discrete ribs extending perpendicularly from the sides of the airfoil with corresponding corners therewith as found in machined airfoil pockets, the need for machining may be reduced if not eliminated in producing the various forms of the hybrid airfoils.

Figure 5:
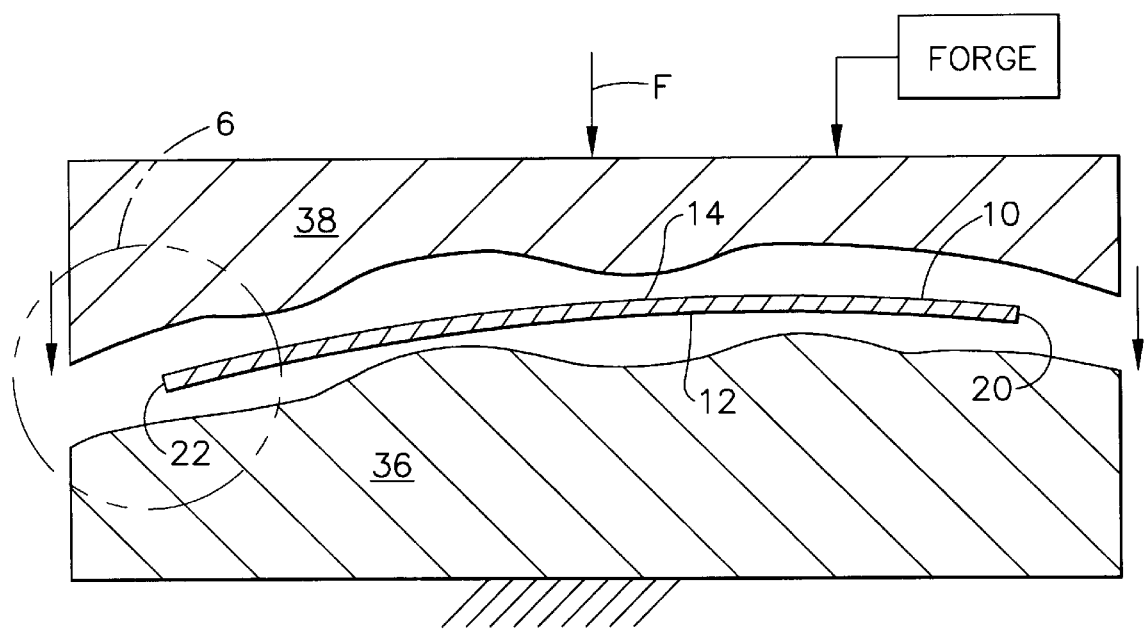
FIG. 5 is a schematic representation of plastically forming the airfoil illustrated in FIGS. 3 and 4 in accordance with an exemplary embodiment.

As illustrated schematically in FIG. 5, the various forms of the airfoils 10a,b,c may be formed in accordance with the present invention by initially forming a plain metallic blank 10 devoid of any surface features and sized in configuration and profile to produce the desired form of the airfoil 10a,b,c. The initial airfoil blank 10 may be formed in any conventional manner such as by forging, and includes the integral dovetail 34 either pre-formed or post-formed to required shape, typically by precision machining thereof.

Figure 6:
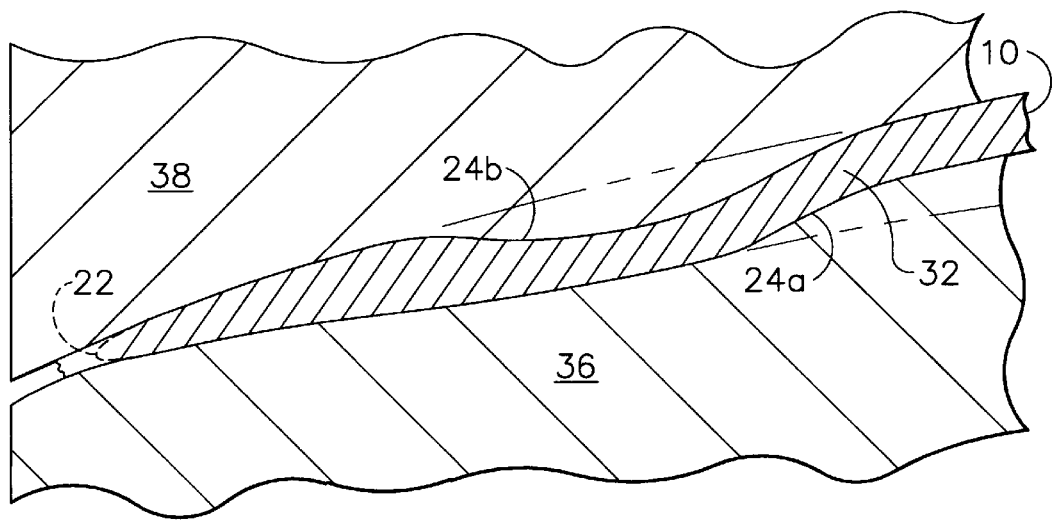
FIG. 6 is an enlarged sectional view of a portion of the airfoil being formed within the circle labeled 6 in FIG. 5.

In an exemplary embodiment illustrated in FIGS. 5 and 6, the plain blank 10 is plastically formed, by forging for example, to produce an incipient airfoil having one or more of the pockets 24a,b formed in the respective opposite sides 12,14 thereof.

Forging is accomplished by using a first or lower die 36 having a forging face configured to produce the desired profile of the airfoil first side 12, including the first pockets 24a therein. Similarly, a second or upper die 38 has a corresponding forging face configured to produce the desired final profile of the airfoil second side 14, including the second pockets 24b therein.

Forging, itself, is a conventional process, but uses the specifically configured dies 36,38 for purposes of the present invention for plastically forming the plain blank 10 into the desired profile for the specific airfoil design desired. The metal blank 10 is heated to forging temperature and plastically formed as the two dies 36,38 engage the blank 10 from opposite sides under suitable forging force F.

As shown in detail in FIG. 6, the airfoil blank 10 undergoes plastic deformation with the parent metal material thereof flowing as required to match the features of the corresponding dies 36,38. The several pockets 24a,b are preferably smooth and smoothly blend over the lateral extent of the airfoil blank to avoid discontinuities, corners, or large volume changes which are not possible to forge. The corresponding septums 32 are smoothly curved to define the respective pockets and are configured within the forging capability of the dies.

Since forging plastically deforms and flows the parent metal of the airfoil blank to achieve the desired profile thereof, some of the metal is extruded along the edges of the blank, and particularly along the incipient form of the leading and trailing edges 20,22. Portions of the extruded edges of the airfoil are illustrated in solid line in FIGS. 6 and 7 and may be formed to the final small radii required for the leading and trailing edges by conventional benching in any suitable manner.

Benching as used herein may include grinding of the leading and trailing edges of the airfoil blank to the final required shape thereof to remove excess material and any irregularities therein. Benching may also include milling, machining, abrasive flow or tumbling, or other precision material removal processes as applied to the leading and trailing edges to produce their final profiles after forging.

Figure 7:
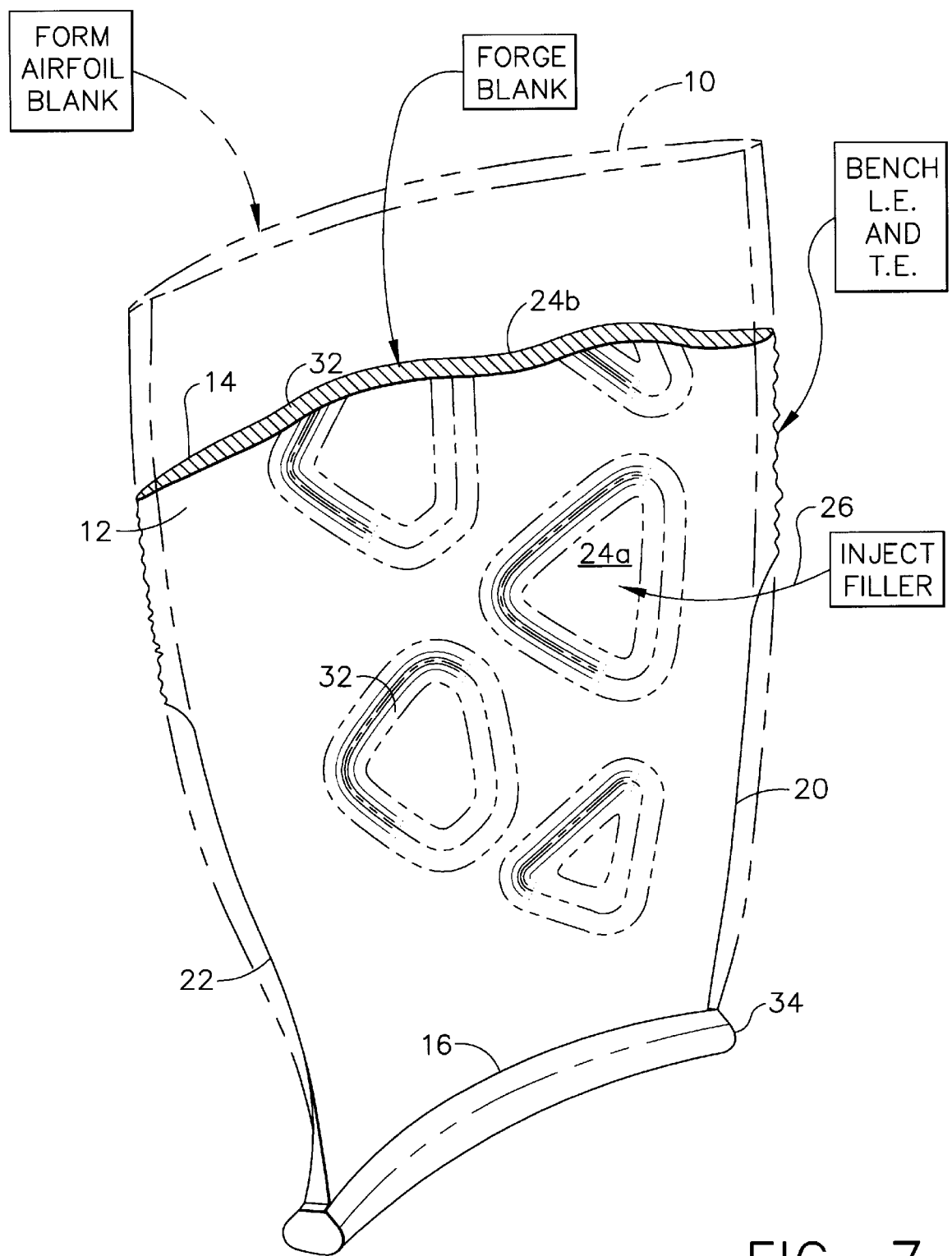
FIG. 7 is a flowchart representation of a method for forming the airfoil illustrated in FIGS. 3 and 4 in accordance with an exemplary embodiment of the present invention.

As shown in FIG. 7, the post-forged airfoil blank includes pockets 24a,b as dimpled depressions in its sides as desired for the particular airfoil design. Whereas the outlet guide vanes 10a,b illustrated in FIGS. 1 and 2 include single pockets extending along the full span thereof on one or both sides of the vane, the more complex fan blade airfoil illustrated in FIG. 7 includes multiple pockets on both sides.

A suitable filler 26 may then be molded or injected into the individual pockets flush with the exposed surfaces of the airfoil to effect the required aerodynamic contour or profile thereof. A polyurethane filler 26 may be injected into the pockets and integrally self-bonded thereto after the required curing process thereof.

In the exemplary embodiment illustrated in FIG. 7, the first pockets 24a are spaced apart from each other over the airfoil first side 12 to leave exposed intervening portions of the first side. Similarly, the second pockets 24b are also spaced apart from each other over the airfoil second side 14 to leave exposed the intervening portions of the second side.

In the corrugated or waffle pattern illustrated in FIGS. 3, 4 and 7, the first pockets 24a on the first side of the airfoil are laterally offset from the second pockets 24b on the second side of the airfoil and complementary in pattern.

Correspondingly, the common septums 32 transition or blend smoothly along corresponding portions of the opposite first and second pockets 24a,b where they overlap. As best shown in FIG. 4, the airfoil blank is plastically formed during forging to serpentine between the opposite pockets 24a,b. Corresponding portions of the airfoil blank define the exposed airfoil first and second sides 12,14 and the integral septums 32 disposed internally in the airfoil. The aerodynamic profile of the airfoil is defined in part by the injected filler 26, and in remaining part by the exposed surfaces of the metal airfoil body.

In the preferred embodiment illustrated in FIGS. 4 and 5, the airfoil blank, including the septums 32, serpentines between the opposite pockets with a generally uniform thickness. Near net shape and net shape forging are best effected with a relatively uniformly thick airfoil blank over the chord of the airfoil, although the thickness typically increases toward the root of the span.

Plastic forming of the airfoil is thusly effected with little if any resistance or obstruction to plastic flow by the smooth pockets 24a,b being formed in the airfoil. The resulting airfoil first and second sides 12,14 are thusly exposed opposite to respective ones of the pockets 24a,b to define respective portions of the aerodynamic profile of the airfoil, with the filler 26 in the pockets defining corresponding portions of the aerodynamic profile at the pockets. The leading and trailing edge regions of the airfoil remain solid metal and complete the aerodynamic profile of the airfoil.

Accordingly, instead of initially forging an airfoil and then machining out therefrom the desired pockets in a hybrid airfoil, machining may be minimized or eliminated, in the preferred embodiment, by simultaneously forming the pockets along with the remainder of the airfoil profile in a common forging operation, with the pockets subsequently being filled to complete the aerodynamic profile.

The relatively simple embodiments illustrated in FIGS. 1 and 2 may be forged to form the smooth pockets therein which are filled to complete the aerodynamic profile. Or, the more complex multiple-pocket embodiment illustrated in FIGS. 3 and 4 may be forged in a common operation without the need for machining the pockets.

An additional advantage of the two-side pocket patterns illustrated in FIGS. 3 and 4 is the attendant structural rigidity afforded by the serpentine septums 32 which extend chordally between the leading and trailing edges, radially along the span, as well as obliquely therebetween. The integral septums 32 may thusly be disposed to preferentially stiffen the blade airfoil for accommodating centrifugal and aerodynamic forces experienced during operation. And, the septums help control the vibratory response of the airfoil under excitation stimuli during operation. In particular, the oblique septums near the leading edge can reduce deformation threat due to bird impact.

Since the septums 32 provide smooth transitions from side to side of the airfoil and are generally arcuate with relatively large radii, any stress concentration therefrom is substantially reduced when compared with pockets having radiused corners therearound. Furthermore, the arcuate configuration of the septums ensures a strong bond with the filler material and reduces peeling stress or peeling tendency therebetween.

And, most significantly, the forged and filled hybrid airfoils disclosed above may be manufactured at substantial reduction in cost due to the elimination or reduction of any machining required to form the pockets.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured letters Patent of the United States is the invention as defined and differentiated in the following claims in which I claim:

1. A hybrid gas turbine engine airfoil comprising:

opposite first and second sides extending from root to tip and between leading and trailing edges;

a first pocket in said first side overlapping only in part a second pocket in said second side, and separated by a common septum; and a filler bonded in said first and second pockets to effect an aerodynamic profile on both said first and second sides.

2. An airfoil according to claim 1 further comprising a plurality of said first pockets in said first side, and a plurality of said second pockets in said second side individually overlapping plural ones of said first pockets.

3. An airfoil according to claim 2 wherein:

said first pockets are spaced apart from each other; and said second pockets are spaced apart from each other.

4. An airfoil according to claim 3 wherein said first pockets are laterally offset from said second pockets for bridging said septums between said airfoil first and second sides.

* * * * *